United States Patent

McMurray

[15] 3,670,154

[45] June 13, 1972

[54] PARALLEL DIGITAL DIFFERENTIAL ANALYZER

[72] Inventor: James A. McMurray, Highlands, N.J.

[73] Assignee: Electronic Associates Inc., Long Branch, N.J.

[22] Filed: Sept. 14, 1970

[21] Appl. No.: 71,883

[52] U.S. Cl. ....................................235/152, 235/150.31
[51] Int. Cl. ....................................................G06f 7/38
[58] Field of Search ..................................235/152, 150.31

[56] References Cited

UNITED STATES PATENTS

| | | | |
|---|---|---|---|
| 3,139,522 | 6/1964 | Voles | 235/150.31 X |
| 3,137,787 | 6/1964 | Spencer et al. | 235/150.31 X |
| 3,148,273 | 9/1964 | Truitt et al. | 235/150.31 X |

*Primary Examiner*—Malcolm A. Morrison
*Assistant Examiner*—David H. Malzahn
*Attorney*—Edward A. Petko and Robert M. Skolnik

[57] ABSTRACT

The specification discloses a parallel digital differential analyzer employing a first register, a circulating adder and a plurality of JK flip-flops for updating the adder, the flip-flops being controlled from a clock source. The polarity and magnitude of the overflow is detected by polarity sensitive logical single shot multivibrators connected to the output of a selected JK flip-flop.

2 Claims, 1 Drawing Figure

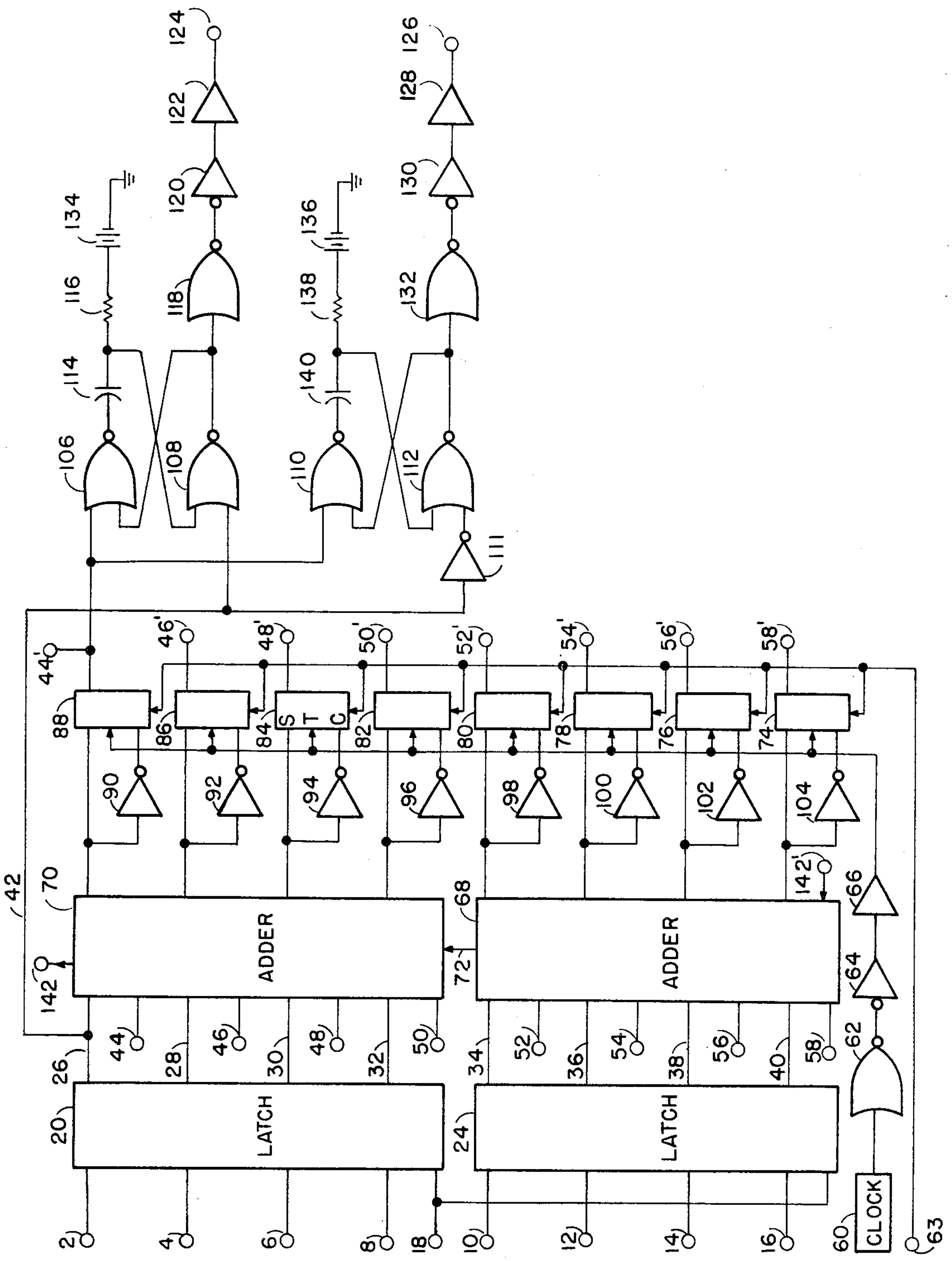
INVENTOR.
JAMES A. MC MURRAY
BY
ATTORNEY

PARALLEL DIGITAL DIFFERENTIAL ANALYZER

This invention relates to a digital differential analyzer (DDA), and more particularly to a parallel DDA which achieves fast operation as contrasted with the prior art serial DDA.

The DDA has been described extensively in the prior art. This device includes two registers, an R-register and a Y-register. Load gates for each register are provided. The load gates enable the loading of binary values into both registers which binary values are known as initial conditions. A so-called R-adder is provided for adding or subtracting the value in the Y-register to or from the value stored in the R-register. The result of this subtraction or addition is stored in the R-register. A Y-adder is also provided for adding or subtracting a scale bit to or from the Y-register. An overflow detector is provided for sensing when the value in the R-register becomes so large that it overflows. Upon the occurrence of an overflow, an output from the overflow detector is indicated. The circuit operates by first inserting the desired initial condition value into the registers. The number stored in the R-register will increase to the point where an overflow occurs resulting in an output from the overflow detector. The polarity of the output from such detector depends on the polarity of the initial condition. As operation continues, the overflow detector outputs will continue at a rate which is dependent on the magnitude of the initial condition and a clock source.

In addition, a DDA may alter the rate of output of the overflow detector by changing the initial condition in the Y-register through the use of a scale bit. The larger the magnitude of the scale bit, the faster the rate of change in the Y-register and thus the faster the rate of the overflow output.

The present invention relates to a parallel DDA where the signal transfer occurs in parallel rather than serially. Overflow is accumulated in an adder which is advanced by clock controlled JK flip-flops. Overflow is detected from the output of a selected JK flip-flop and connected to one-shot circuits where the sign (i.e., overflow or underflow) and magnitude is detected.

It is an object of the invention to provide an improved DDA having high speed because of parallel operation.

Another object of the present invention is the provision of JK flip-flops whereby the rate of overflow from the DDA can be controlled.

These as well as further objects and advantages of the present invention will become apparent to those skilled in the art from the following specification reference being had to the accompanying drawings in which:

The single FIGURE is a partial schematic and block diagram of the preferred embodiment of the invention. In the drawing, an 8-bit parallel DDA is shown. More particularly, the 8-bit input word is applied in parallel to terminals 2, 4, 6, 8, 10, 12, 14 and 16. Terminals 2, 4, 6, and 8 are connected to the inputs of a quad latch 20 which, in practice, is a 4-bit register manufactured by Motorola Co. under their model designation MC767T. Terminals 10, 12, 14 and 16 are connected to the inputs of another quad latch 24 which is the same unit as latch 20. As will be described later, registers 20 and 24 function as the Y-register in the DDA. A further terminal 18 is provided connected to both registers 20 and 24. This terminal acts as the load control so that, upon execution of a load control function, the signal at the input terminals is connected into the registers 20 and 24.

The contents of registers 20 and 24 are outputted to adders 70 and 68, respectively, via lines 26, 28, 30, 32, 34, 36, 38, and 40. It is also to be noted that input terminals 44, 46, 48, and 50 are provided for adder 70 and input terminals 52, 54, 56, and 58 are provided for adder 68. As will be further described below, adders 70 and 68 are equivalent in function to the adder in the serial DDA.

A number of flip-flops 74, 76, 78, 80, 82, 84, 86, and 88 are provided. These flip-flops are of the "JK" type operating in the shift-register mode. A "JK" flip-flop produces no ambiguous output states from simultaneous inputs in either the ONE or the ZERO state. ONE and ZERO state inputs on both the set (S) and clear (C) inputs of the flip-flop causes the output to reverse or toggle on each clock pulse. These devices are described at pages 128 – 129 of the text *LOGICAL DESIGN OF DIGITAL COMPUTERS*, by Montgomery Phister, Jr., published by John Wiley & Sons, Inc., in 1958. With reference to JK flip-flop 84, it will be seen that this flip-flop has inputs denominated S, T, and C. These stand for respectively, set, trigger, and clear. The set input of flip-flop 84 is connected to the corresponding output of adder 70. The trigger input of flip-flop 84 is connected to a clock source 60 via a noninverting buffer consisting of NOR-gate 62 and inverters 64 and 66. The clear input of flip-flop 84 is also connected to the output of adder 70 via an inverter 94. Flip-flop 84 as well as the other JK flip-flops has a respective output terminal 44', 46', 48', 50', 52', 54', 56', and 58' which are connected directly to the corresponding terminals 44, 46, 48, 50, 52, 54, 56 and 58 of adders 70 and 68. The connections between corresponding pairs of these two terminals is not shown in order to simplify the drawing.

Again turning to JK flip-flop 84, it will be seen, that if the output of adder 70 to this JK flip-flop is a logic high, this logic high would be applied to the set input of the flip-flop and would appear as a logic low in the clear input because of inverter 94. The opposite would be true if the output of adder 70 is a logic low. From the truth table for the "JK" flip-flop, the appearance of a one and a zero as inputs thereto will produce a one output upon the occurrence of a clock pulse at the trigger (T) input. Upon the occurrence of a clock pulse, a logical one output is produced at terminal 48'. This output appears as an input to terminal 48. The appearance of a zero at the set input and a one at the clear input will produce a logic zero at output terminal 48' upon the occurrence of a pulse at the trigger T input. This logic zero will also be seen to be applied to terminal 48.

Carries are generated in adders 68 and 70 which are transferred between the two adders via a lead 72. The carries circulate from adder 70 to adder 68 via a loop which includes terminals 142 and 142' and the leads connected between these terminals. In this manner, the outputs of the JK flip-flops in parallel are continuously shifted in adders 68 and 70 generating the requisite carries.

The sign bit of the 8-bit binary input work is applied to terminal 2 and is connected to the inputs of NOR-gates 112, and 108, via lead 42 at the output of latch 20. The sign bit is also applied to JK flip-flop 88 via the corresponding output of adder 70. After shifting however, it would be recognized that the information bit in flip-flop 88 may no longer represent the sign bit. The output of flip-flop 88 is applied as an input to NOR-gates 106 and 110.

NOR-gates 106 and 108 constitute a logical single shot multivibrator, the timing of which is controlled by the time constant of the RC network including capacitor 114, resistor 116, and a battery 134. Another one-shot includes NOR-gates 110 and 112, the timing of which is controlled by capacitor 140, resistor 138 and a voltage source represented by battery 136. The output of the single shots taken from the outputs of NOR-gates 108 and 112 are applied to noninverting buffers consisting of NOR-gate 118 and inverters 120 and 122 and NOR gate-132 and inverters 130 and 128 respectively. The outputs of these buffers are connected to output terminals 124 and 126. Output terminal 124 supplies a positive overflow while output 126 supplies the negative overflow. More particularly, overflow in the combination of adders 68 and 70 is applied to NOR-gates 106 and 110 from the output of JK flip-flop 88. The sign bit of the input signal is applied as an input to NOR-gate 112 via inverter 111.

The circuit operates as follows: Information is inputted at terminals 2, 4, 6, 8, 10, 12, 14, and 16 into the Y-register of the DDA which consists of quad latches 20 and 24. This represents the loading of the initial condition for the DDA. The clock is then activated and the contents of the Y-register are added into the R-register (flip-flops 74, 76, 78, 80, 82, 84, 86 and 88). Accumulation in the R-register is then accomplished by transfer occurring from the Y-register to the R-register. The number in the adder increases and, at a certain point, an overflow will occur. When an overflow occurs, one of the output lines to terminals 124 or 126 is activated depending on whether the overflow is positive or negative. The value of the input data is retained in the Y-register until the computation is complete.

As was described above in connection with the serial DDA, integration is performed by controlling the rate of overflow by controlling the energization of a clock source 60. For the variable controlling the clock source 60 may be loaded into a down counter and the clock applied to count down to zero. When the information stored in the down counter reaches zero, computation ceases by disabling clock source 60.

I claim:

1. A parallel digital differential analyzer comprising:

register means having a plurality of outputs for storing a digital signal;

adder means having first input means connected to said register means, second input means, and output means a clock source, a plurality of JK flip-flops connected to said clock source and to said adder means output; the output of said JK flip-flops being connected to said second input means, whereby said adder sums said digital signal and the outputs of said JK flip-flops as a function of said clock source producing an overflow; and overflow detection means connected to one of said JK flip-flops and to one of said adder means inputs for producing an output signal representing the sign and magnitude of said overflow.

2. The parallel digital differential analyzer of claim 1 wherein said overflow detection means includes first and second logical non-inverting single-shot multivibrators said multivibrators each being connected to said adder means input and said JK flip-flop.

* * * * *